(12) United States Patent  
Park et al.

(10) Patent No.: US 7,930,003 B2
(45) Date of Patent: Apr. 19, 2011

(54) COMMUNICATION TERMINAL (75) Inventors: Su Bum Park, Seoul (KR); Kwang Joon Lee, Goyang-si (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 11/553,409

(22) Filed: Oct. 26, 2006

(65) Prior Publication Data

US 2007/0212925 A1 Sep. 13, 2007

(30) Foreign Application Priority Data

Oct. 26, 2005 (KR) .......................... 10-2005-0101527
Dec. 30, 2005 (KR) .......................... 10-2005-0135019

(51) Int. Cl.
H04M 1/00 (2006.01)

(52) U.S. Cl. ................ 455/575.1; 455/575.3; 455/575.4; 455/575.8

(58) Field of Classification Search .................. 455/575, 455/550.1
See application file for complete search history.

(56) References Cited

U.S. PATENT DOCUMENTS

| 5,949,408 | A | 9/1999 | Kang et al. |
| 6,989,984 | B2 * | 1/2006 | Sutton et al. ............. 361/679.16 |
| 2004/0209659 | A1 * | 10/2004 | Sun et al. ................... 455/575.4 |
| 2004/0235540 | A1 | 11/2004 | Yajima |
| 2005/0070343 | A1 * | 3/2005 | Janninck et al. ........... 455/575.1 |
| 2005/0124397 | A1 * | 6/2005 | Yamasaki .................. 455/575.4 |
| 2005/0137001 | A1 * | 6/2005 | Bell et al. .................. 455/575.4 |
| 2005/0192066 | A1 * | 9/2005 | Park et al. ................. 455/575.3 |

FOREIGN PATENT DOCUMENTS

| CN | 1489361 | 4/2004 |
| CN | 1499808 | 5/2004 |
| DE | 20-2005-000268 U1 | 4/2005 |
| DE | 103 41 073 A1 | 4/2005 |
| EP | 1 284 450 A2 | 2/2003 |
| EP | 1 758 345 A | 2/2007 |
| GB | 2 393 066 A | 3/2004 |
| JP | 2001-156893 A | 6/2006 |

OTHER PUBLICATIONS

Motorola T720 Users Manual (2002).*
T-Mobile Sidekick Users Manual (2002).*
T-Mobile Sidekick Users Manual (2002) pp. 1, 16, and 17.*

* cited by examiner

*Primary Examiner* — Nghi H Ly
*Assistant Examiner* — Joshua Schwartz
(74) *Attorney, Agent, or Firm* — Workman Nydegger (57) ABSTRACT

Disclosed herein is a communication terminal which has an adequate structure for keys so as to sufficiently fulfill various communication services, to thereby make the communication terminal compact, and can control operation of the keys so as to minimize a data input error of the keys. The communication terminal includes a first housing, a second housing which is oppositely coupled to the first housing, and a control unit which interrupts operation of a data input part provided at either the first housing or the second housing according to movement of the second housing with respect to the first housing.

13 Claims, 9 Drawing Sheets

COMMUNICATION TERMINAL

This application claims the benefit of Korean Patent Application Nos. 10-2005-0101527, filed on Oct. 26, 2005, and 10-2005-0135019 filed on Dec. 30, 2005, which is hereby incorporated by reference as if fully set forth herein.

BACKGROUND OF THE INVENTION

1. Field of the Invention

The present invention relates to a communication terminal.

2. Discussion of the Related Art

Recently, a technology of a personal portable communication terminal has been rapidly advanced.

According thereto, various design communication terminals, e.g., a bar type terminal, a flip type terminal and a folder type terminal, are produced.

Figure 1:
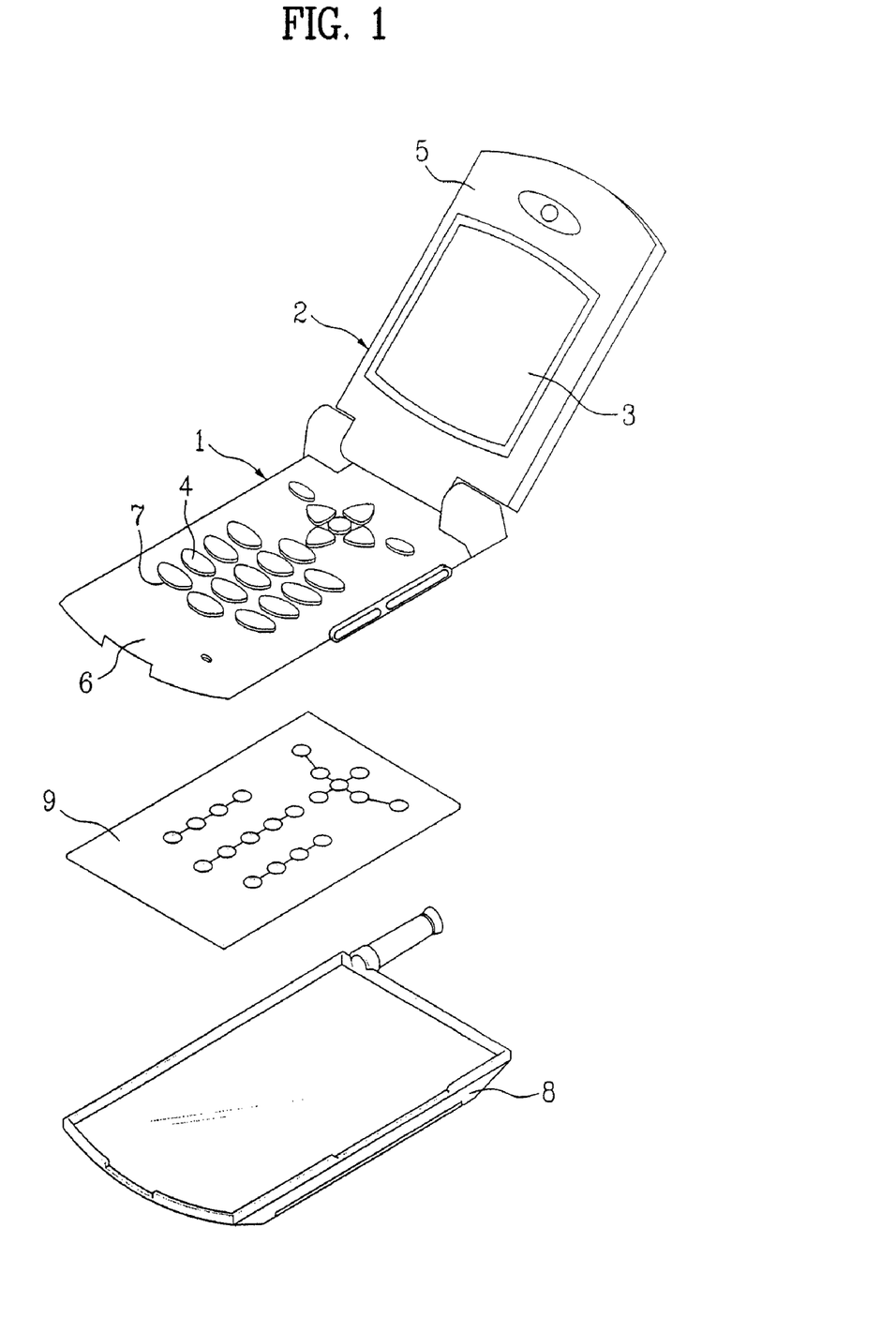
FIG. 1 is an exploded perspective view showing a structure of a conventional folder type communication terminal.

FIG. 1 is an exploded perspective view showing a structure of a conventional folder type communication terminal.

Referring to FIG. 1, a folder type communication terminal comprises a main body 1 and a folder 2. The main body 1 and the folder 2 are hingedly coupled to each other.

Therefore, the folder 2 is hingedly rotated into an open position or a closed position with respect to the main body 1.

The main body 1 includes an upper cover 6 which is formed with a plurality of holes 7 for keys 4, a lower cover 8 which is disposed under the upper cover 6 and coupled thereto, a circuit board 9 on which various components are mounted and which is interposed between the upper cover 6 and the lower cover 8, and a key pad (not shown) which is interposed between the upper cover 6 and the circuit board 9 for data input. The keys 4 on the key pad are inserted into the holes 7 of the upper cover 6, respectively, and exposed outside.

The folder 2 includes a display device 3 (e.g., an LCD (Liquid Crystal Display)) for displaying an image corresponding to data, and a folder housing 5 for protecting the display device 3.

In the conventional folder type communication terminal structure described as above, the data input is performed by hingedly rotating the folder 2 into the open position from the main body 1 and pressing the keys 4.

Recently, as the communication service is diversified, besides the folder type communication terminal, a slide type terminal or a swing type terminal has been developed.

The slide type terminal is widely used until the commencement of a digital broadcasting service through communication terminals. However, the current trend is to develop the various swing type terminals.

The types of the communication terminals developed until now include the bar type, flip type, folder type, slide type and swing type terminals.

Of the above various types of the communication terminals, the flip type, folder type, slide type and swing type terminals commonly have a main body, and a movable unit which is connected structurally and electrically to the main body and can move freely to a predetermined extent with respect to the main body.

Most communication terminal manufacturers concentrate their efforts to develop the compact terminals.

However, because the communication service is diversified more and more and continuously upgraded, it is very difficult to make the communication terminal compact. Especially, when making the communication terminal compact, the arrangement of the keys is a very important design factor. Also, decreasing the number or size of the keys causes an inconvenience to users.

SUMMARY OF THE INVENTION

Accordingly, the present invention is directed to a communication terminal that substantially obviates one or more problems due to limitations and disadvantages of the related art.

An object of the present invention is to provide a communication terminal which has an adequate structure for keys so as to sufficiently fulfill various communication services, to thereby make the communication terminal compact.

Another object of the present invention is to provide a communication terminal which can control operation of the keys so as to minimize a data input error of the keys.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication terminal comprises: a first housing; a second housing which is oppositely coupled to the first housing; and a control unit which interrupts operation of a data input part provided at either the first housing or the second housing according to movement of the second housing with respect to the first housing.

Preferably, the second housing may swing while opposing a portion of the first housing. At this time, the control unit may interrupt the operation of the data input part until the second housing swings to a predetermined angle.

Preferably, the control unit may interrupt the operation of the data input part during a predetermined time from when the movement of the second housing is detected.

Preferably, the data input part includes at least one key.

In another aspect of the present invention, a communication terminal comprises: a main body housing which is formed with an upper stepped surface and a lower stepped surface; a first input part which is provided at a slanted surface formed between the upper stepped surface and the lower stepped surface; and an upper housing which swings while opposing the lower stepped surface of the main body housing.

Preferably, the communication terminal further comprises: a control unit which determines whether the upper housing swings or not and controls input operation of the first input part. If determining that the upper housing swings, the control unit disables the input operation of the first input part.

Preferably, the control unit may disable the input operation of the first input part during a predetermined time from when the swinging of the upper housing is detected.

Also, the control unit may disable the input operation of the first input part until the upper housing swings to a predetermined angle.

Preferably, the communication terminal further comprises: a second input part which is provided at the upper stepped surface of the main body housing.

Preferably, the communication terminal further comprises: a third input part which is provided at the lower stepped surface of the main body housing. The third input part may be shielded or exposed according to the swinging of the upper housing.

Preferably, the first input part includes at least one key.

Preferably, the upper housing includes at least one output part which is positioned at an opposite surface of the upper housing to a surface facing the lower stepped surface of the main body housing. The output part includes a display device.

In yet another aspect of the present invention, a communication terminal comprises: a main body which includes an upper stepped surface, a lower stepped surface and a slanted surface formed between the upper stepped surface and the lower stepped surface, the slanted surface being provided with at least one key; a display unit which is coupled to the lower stepped surface of the main body, the display unit swinging while opposing the lower stepped surface; and a control unit which determines whether the display unit swings or not and controls operation of the key. If determining that the display unit swings, the control unit temporarily interrupts the operation of the key.

Preferably, the upper stepped surface and the lower stepped surface of the main body are provided with keys. Accordingly, if determining that the display unit swings, the control unit temporarily interrupts the operation of at least one of the keys provided at the upper stepped surface and the lower stepped surface. Especially, the keys provided at the lower stepped surface are shielded or exposed according to the swinging of the display unit.

Preferably, the keys provided at the lower stepped surface and the keys provided at the slanted surface are formed at one key pad.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A communication terminal according to the present invention includes a main body, and a movable unit which is connected structurally and electrically to the main body and can move freely to a predetermined extent with respect to the main body.

Components inside the main body are protected by a main body housing, and components inside the moving unit are protected by an upper housing. For example, the moving unit coupled onto the main body may be a display unit, and the display unit is protected by the upper housing.

Hereinafter, for the convenience of description, the main body will be explained as the main body housing, and the moving unit coupled onto the main body will be explained as the upper housing. In other words, the main body housing corresponds to the main body, and the upper housing corresponds to the moving unit coupled onto the main body.

The communication terminal according to the present invention is configured such that the upper housing moves with respect to the main body housing in a state of opposing the main body housing. The main body housing is formed with a step. Particularly, the upper housing moves while opposing a lower stepped surface of the main body housing. When forming the step at the main body housing, a slanted surface is provided between the lower stepped surface and the upper stepped surface so as to diversify the arrangement of the keys. And, at least one key is positioned at the slanted surface.

Seen from the above description, it is preferable that the present invention is adopted to the slide type terminal or the swing type terminal. However, it should be noted that the scope of the present invention is not limited to the slide type terminal or the swing type terminal, and can also be applied to other types of communication terminals.

Further, the communication terminal according to the present invention is configured such that parts for data input (e.g., the keys) are controlled by the movement of the upper housing with respect to the main body housing.

In other words, according to the movement of the upper housing with respect to the main body housing, a control unit provided in the communication terminal temporarily interrupts or disables the operation of the keys provided at the upper housing or the main body housing.

Hereinafter, the communication terminal of the present invention will be described in detail with reference to the annexed drawings. In the following description, the swing type terminal will be explained, however, the scope of the present invention can also be applied to the slide type terminal or the like.

Figure 2:
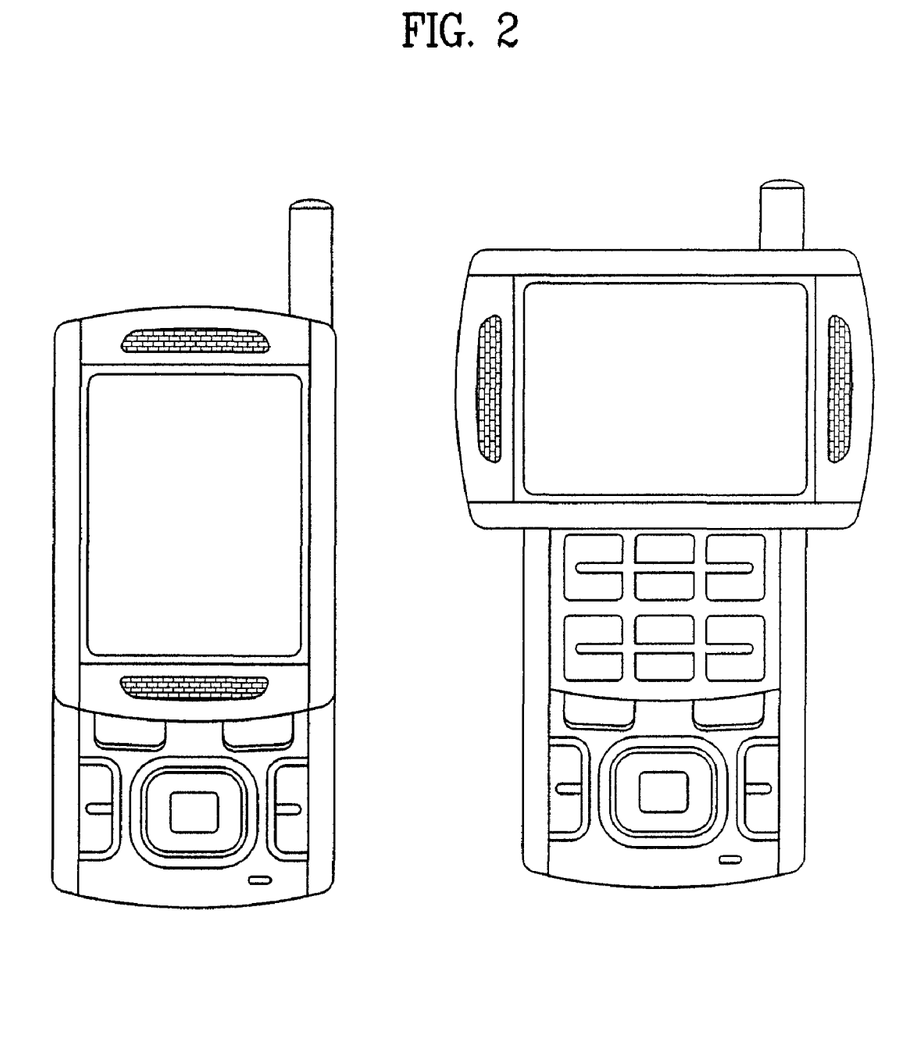
FIG. 2 is a front view showing an operating state of an upper housing of a swing type terminal.

FIG. 2 is a front view showing an operating state of the upper housing of the swing type terminal.

Referring to FIG. 2, the communication terminal according to the present invention is configured such that the upper housing moves with respect to the main body housing in a state of opposing the main body housing. More particularly, the upper housing swings while opposing an upper surface of the main body housing.

The communication terminal further includes a switch (not shown) which detects the movement of the upper housing.

The switch is configured to be pressed when the upper housing swings.

Accordingly, when the upper housing swings (or is rotated) as shown in FIG. 2, the switch is pressed. Thus, the movement of the upper housing is detected by the operation of the switch.

During a predetermined time after the switch is pressed, the operation of the keys is partially or totally interrupted temporarily. In other words, during the predetermined time after the upper housing swings, the operation of the keys is disabled. Accordingly, during the aforesaid predetermined time, although the keys are pressed, the data input process is not performed.

Figure 3:
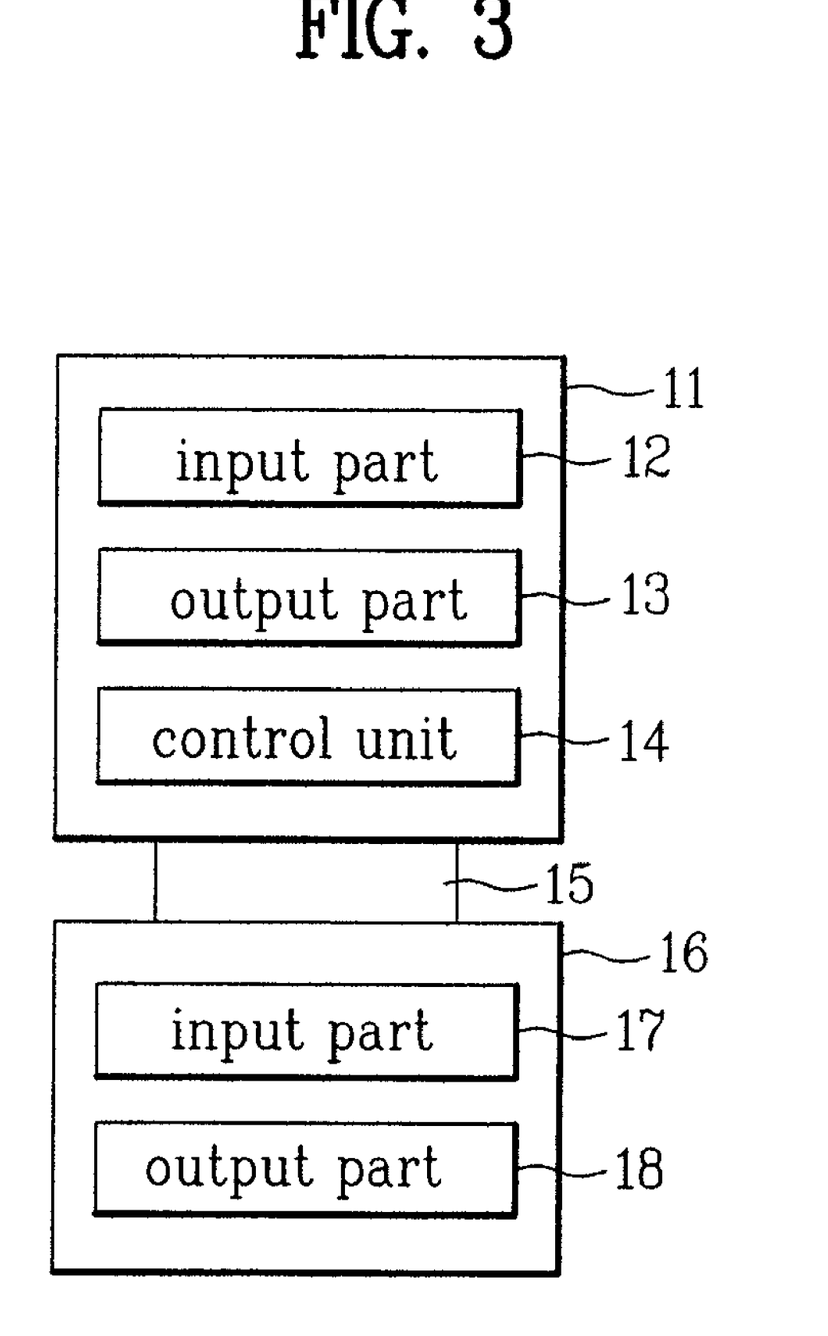
FIG. 3 is a block diagram showing an inner structure of a communication terminal in accordance with the present invention.

FIG. 3 is a block diagram showing an inner structure of the communication terminal according to the present invention.

Referring to FIG. 3, the communication terminal of the present invention comprises a main body housing 11, and an upper housing 16 which is movably coupled to the main body housing 11.

The upper housing 16 is coupled onto the main body housing 11.

The main body housing 11 includes a first data input part 12, a first output part 13 and a control unit 14.

The upper housing 16 includes a second data input part 17 and a second output part 18.

The first and second data input parts 12 and 17 may be a key or a touch pad that a user manipulates for data input.

The first and second output parts 13 and 18 may be a display device such as an LCD (Liquid Crystal Display), or a voice output device such as a speaker. The output parts 13 and 18 output the data processed by the control unit 14.

The upper housing 16 is coupled onto the main body housing 11, and moves while opposing the main body housing 11.

The control unit 14 determines whether the upper housing 16 moves with respect to the main body housing 11 or not. The control unit 14 interlocks with the above-described switch for detecting the movement of the upper housing 16. The switch is configured to be pressed when the upper housing 16 moves with respect to the main body housing 11. Accordingly, in response to the operation of the switch, the control unit 14 determines whether the upper housing 16 moves or not.

For example, in case of the slide type terminal, the movement of the upper housing 16 is the up/down sliding movement. In case of the swing type terminal, the movement of the upper housing 16 is the swing movement.

If determining that the upper housing 16 moves, the control unit 14 partially or totally interrupts the operation of the data input parts 12 and 17. Therefore, the operation of the corresponding data input parts 12 and 17 is disabled.

In the present invention, the time during which the operation of the data input parts 12 and 17 is disabled is preset (which will be called a "disabled-time").

Accordingly, the control unit 14 disables the operation of the data input parts 12 and 17 until the disabled-time expires after determining that the upper housing 16 moves.

When the disabled-time expires, the control unit 14 enables the operation of the corresponding data input parts 12 and 17.

For another example, the control unit 14 may disable the operation of the data input parts 12 and 17 from when the upper housing 16 starts moving until the upper housing 16 stops moving.

When the movement of the upper housing 16 is completed, the control unit 14 enables the operation of the corresponding data input parts 12 and 17. For example, in case of the slide type terminal, when the up-sliding movement or the down-sliding movement stops, the control unit 14 enables the operation of the corresponding data input parts 12 and 17. In case of the swing type terminal, when the swinging movement stops, the control unit 14 enables the operation of the corresponding data input parts 12 and 17.

For yet another example, the control unit 14 may temporarily disable the operation of the data input parts 12 and 17 when the upper housing 16 starts moving. In case of the swing type terminal, from when the upper housing 16 starts swinging until the upper housing 16 swings to a predetermined angle, the control unit 14 temporarily disables the operation of the data input parts 12 and 17.

On the other hand, it can also be considered that the present invention is adopted to the flip type terminal or the folder type terminal. In case of the flip type terminal, the control unit 14 disables the operation of the keys during the predetermined time after the flip is opened. In case of the folder type terminal, the control unit 14 disables the operation of the keys during the predetermined time after the folder is opened.

Accordingly, when the upper housing 16 moves, the control unit 14 disregards the data inputted from the data input parts 12 and 17 such as the keys or the touch pad.

It is most preferable that the control unit 14 controls the operation of keys positioned at a slanted surface (which will be described later) of the main body housing 11 according to the movement of the upper housing 16. The keys positioned at the slanted surface of the main body housing 11 and the operation control thereof will now be described in detail.

FIGS. 4 to 7 illustrate the communication terminal in detail according to the present invention, more particularly, the swing type terminal in which the upper housing is swingably coupled to the main body housing.

Figure 4:
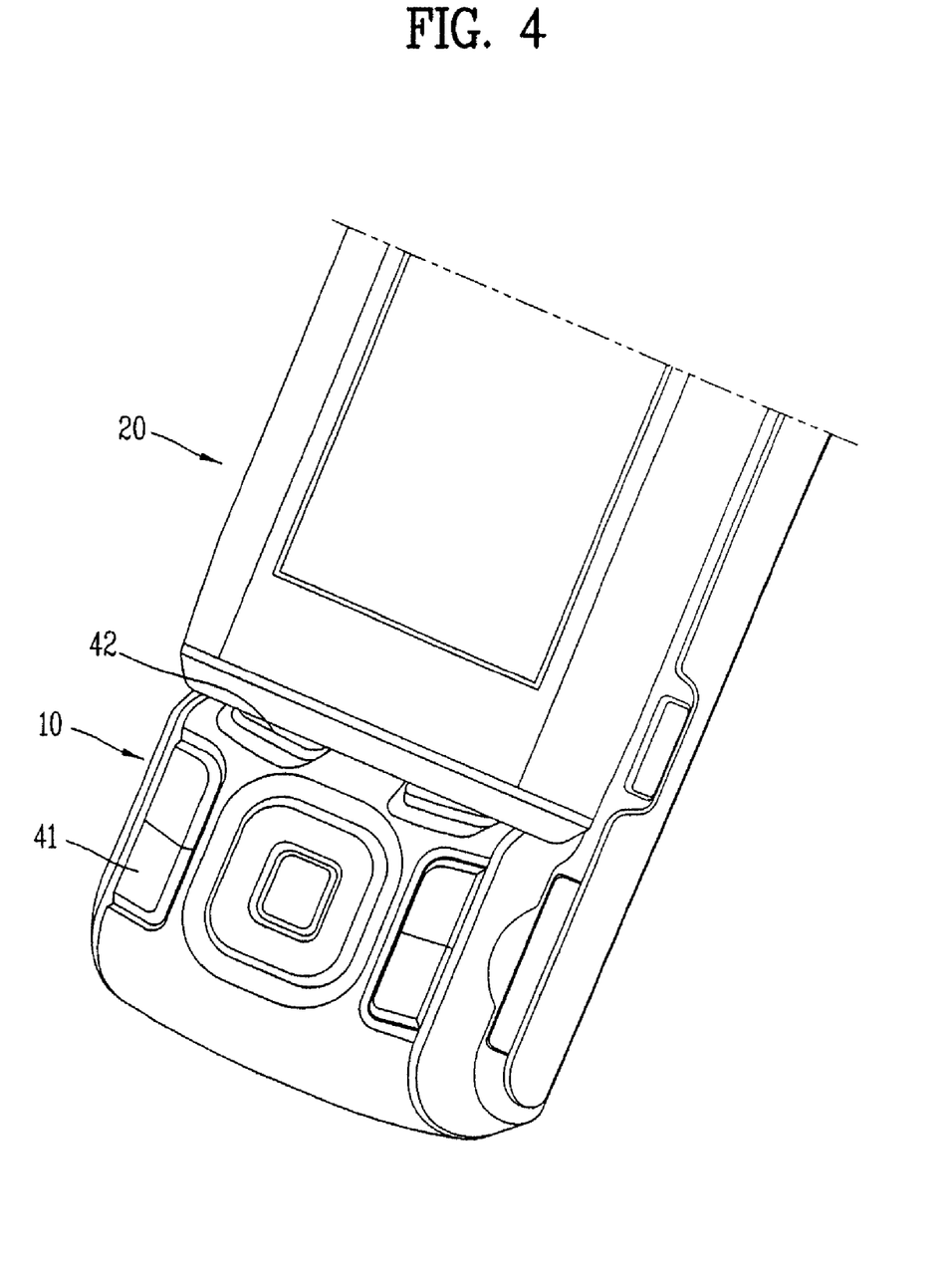
FIG. 4 is a perspective view showing a closed state of an upper housing of a communication terminal in accordance with the present invention.
Figure 5:
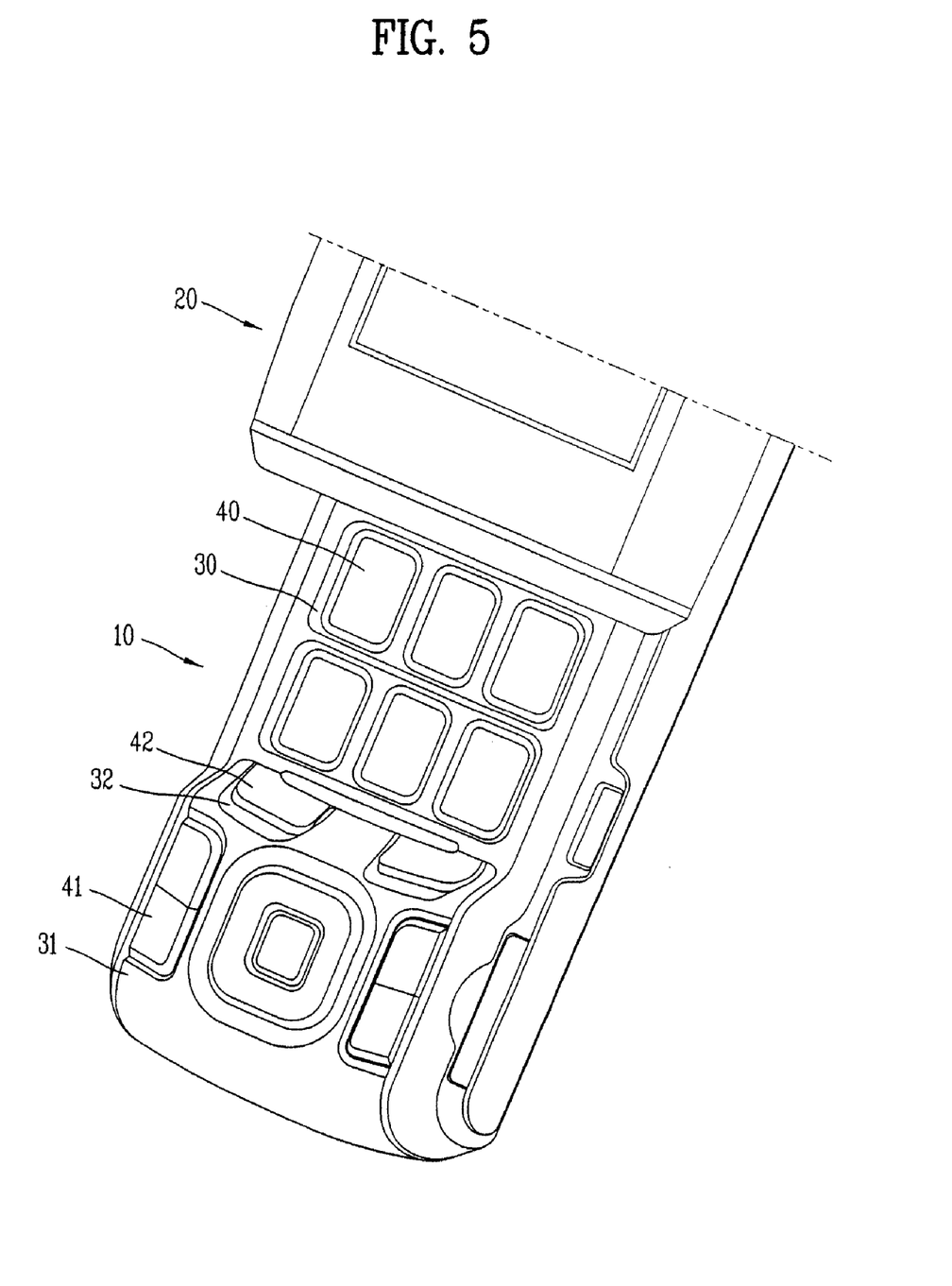
FIG. 5 is a perspective view showing an open state of an upper housing of a communication terminal in accordance with the present invention.

FIG. 4 is a perspective view showing a closed state of the upper housing, and FIG. 5 is a perspective view showing an open state of the upper housing.

Referring to FIGS. 4 and 5, the swing type communication terminal comprises a main body housing 10 which is formed with a step, and an upper housing 20 which swings while opposing a lower stepped surface 30 of the main body housing 10.

The main body housing 10 is shaped to have an upper stepped surface 31, a lower stepped surface 30, and a slanted surface 32 formed between the upper stepped surface 31 and the lower stepped surface 30.

The swing type terminal further comprises a display device which is provided at the upper housing 20 to output the data. The display device is positioned at an opposite surface of the upper housing 20 to the surface facing the lower stepped surface 30 of the main body housing 10. The display device and the upper housing 20 for protecting the display device are coupled to constitute a display unit.

The swing type terminal of the present invention is provided with three key groups 40, 41 and 42 for data input.

The lower key group 40 is positioned at the lower stepped surface 30 of the main body housing 10.

The upper key group 41 is positioned at the upper stepped surface 31 of the main body housing 10.

The middle key group 42 is positioned at the slanted surface 32 formed between the upper stepped surface 31 and the lower stepped surface 30. Hereinafter, the middle key group 42 will be called a "slanted key group".

The lower key group 40 positioned at the lower stepped surface 30 is shielded or exposed according to the swinging of the upper housing 20.

Also, the slanted key group 42 positioned at the slanted surface 32 may be shielded or exposed according to the swinging of the upper housing 20.

Accordingly, when the upper housing 20 swings to an open position, the lower key group 40 positioned at the lower stepped surface 30 and/or the slanted key group 42 positioned at the slanted surface 32 operate for data input.

But, when the upper housing 20 swings to a closed position, the lower key group 40 positioned at the lower stepped surface 30 and/or the slanted key group 42 positioned at the slanted surface 32 are shielded by the upper housing 20 and their operations for data input are also interrupted.

The upper key group 41 positioned at the upper stepped surface 31 is always exposed regardless of the swinging of the upper housing 20.

When the upper housing 20 swings, the control unit controls the operation of the lower key group 40, the upper key group 41 and the slanted key group 42 for data input. The process of controlling the operation of the key groups 40, 41 and 42 will be described later with reference to FIGS. 8 and 9.

Figure 6:
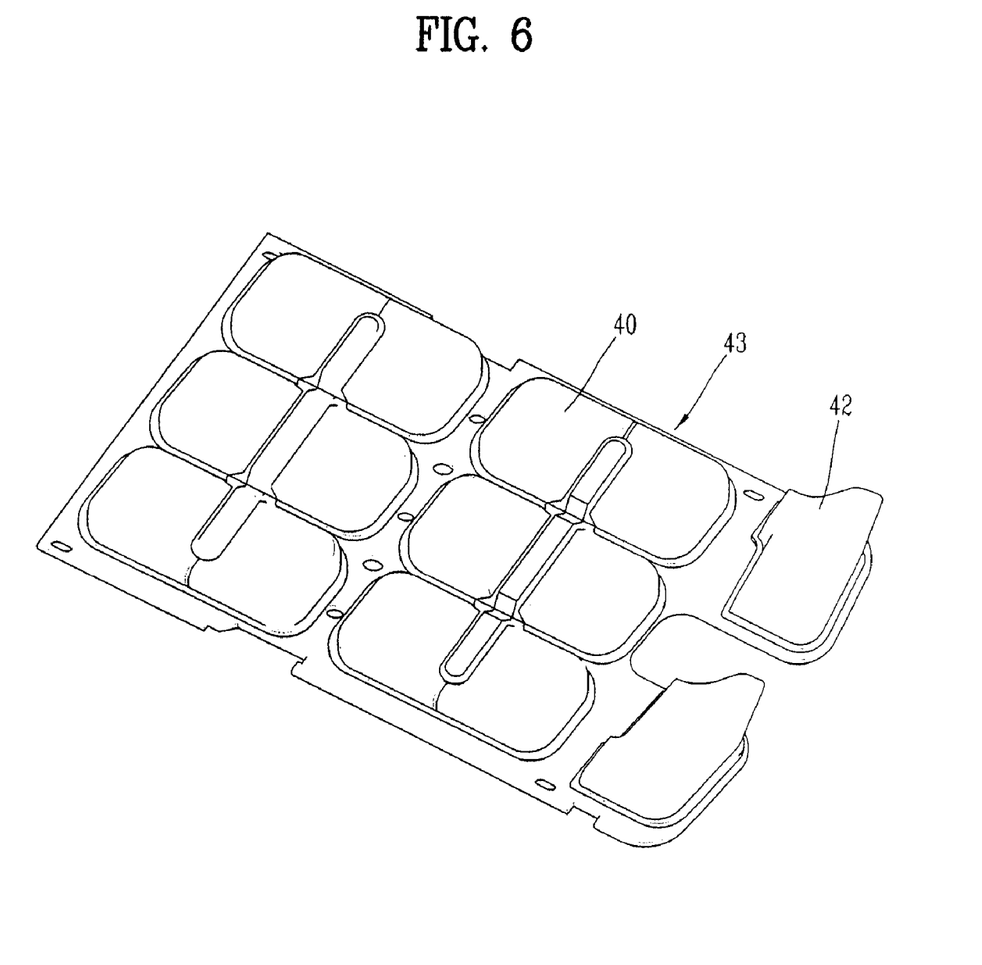
FIG. 6 is a perspective view showing a key pad of a communication terminal in accordance with the present invention.
Figure 7:
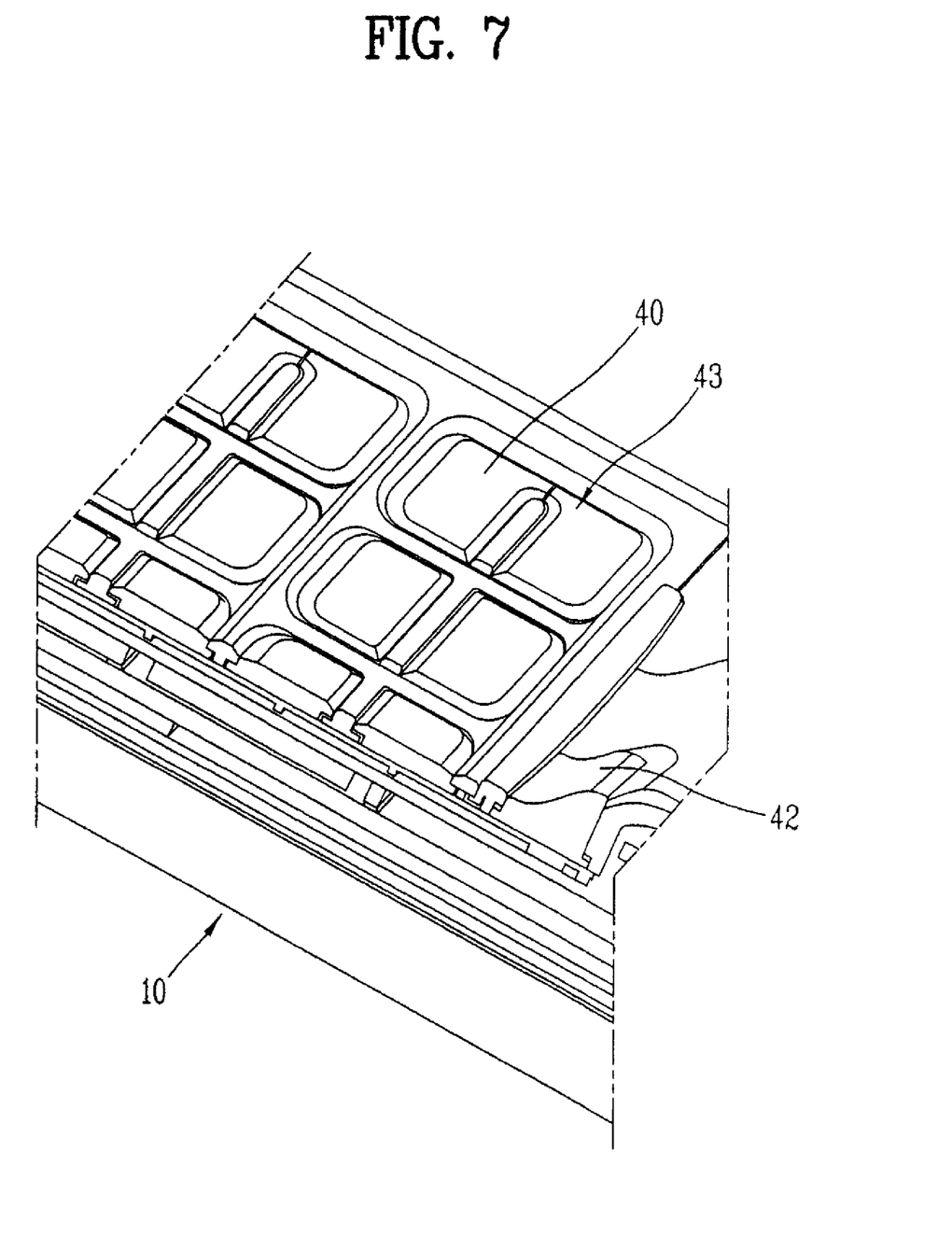
FIG. 7 is a sectional view showing a key pad of a communication terminal in accordance with the present invention.

FIG. 6 is a perspective view showing a key pad of the communication terminal, and FIG. 7 is a sectional view of the key pad.

As shown in FIG. 6, the lower key group 40 positioned at the lower stepped surface 30 of the main body housing 10 and the slanted key group 42 positioned at the slanted surface 32 are formed at one key pad 43.

The main body housing 10 is formed with a plurality of holes. Therefore, the lower key group 40 and the slanted key group 42 formed at the key pad 43 and the upper key group 41 formed at the other key pad are exposed through the holes.

Preferably, the slanted key group 42 positioned at the slanted surface 32 has a trapezoid-shaped touch surface. Commonly used actuators (not shown) are mounted under the slanted key group 42.

The actuators are disposed under the slanted key group 42 by several millimeters. Preferably, the actuators are disposed under the slanted key group 42 by 1 mm, thereby increasing operational reliability of the slanted key group 42 and improving clicking feeling.

Hereinafter, the process by which the control unit controls the operation of the key groups 40, 41 and 42 for data input according to the swinging of the upper housing will be described.

Figure 8:
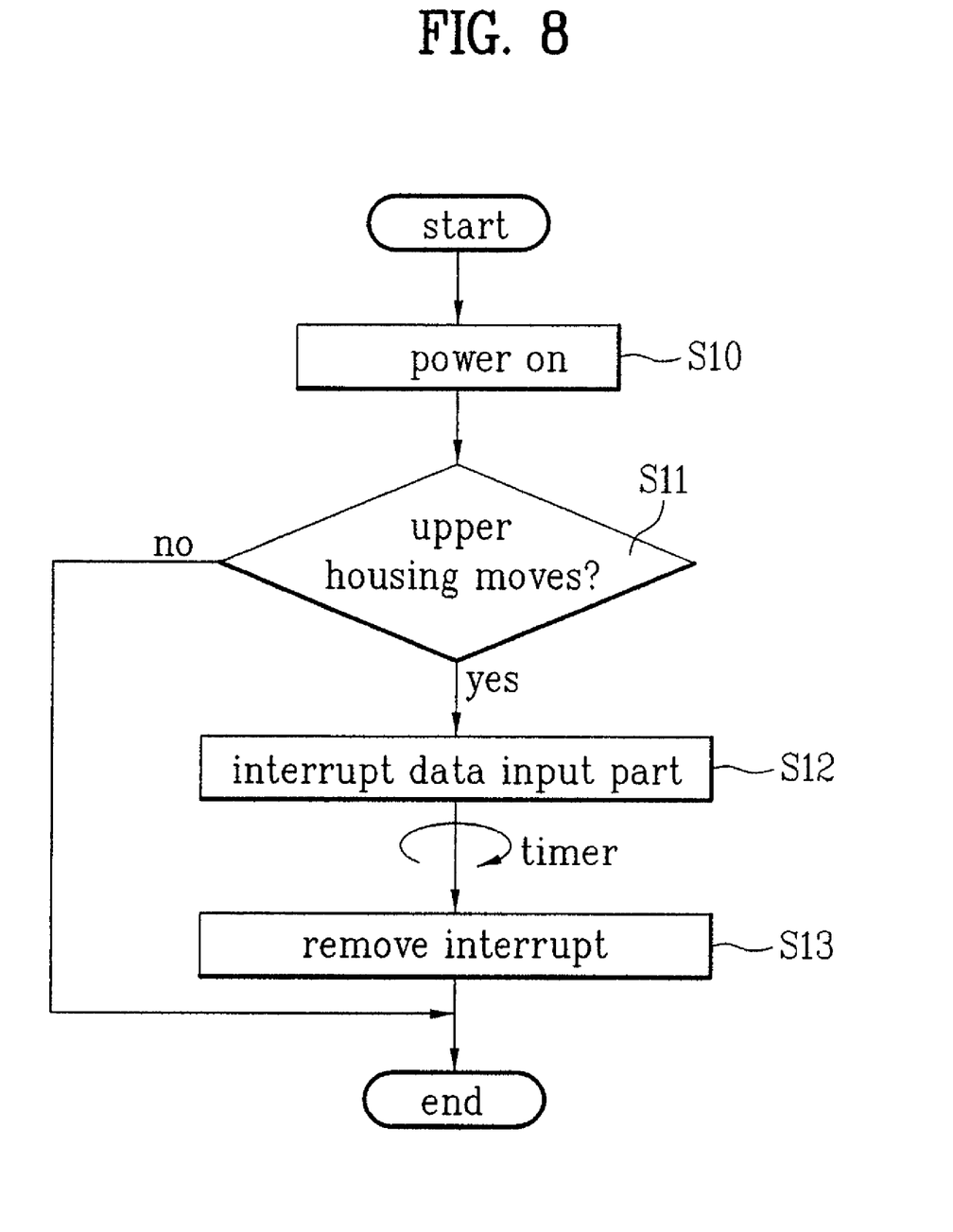
FIG. 8 is a flow chart illustrating a data input control process of a communication terminal in accordance with the present invention.
Figure 9:
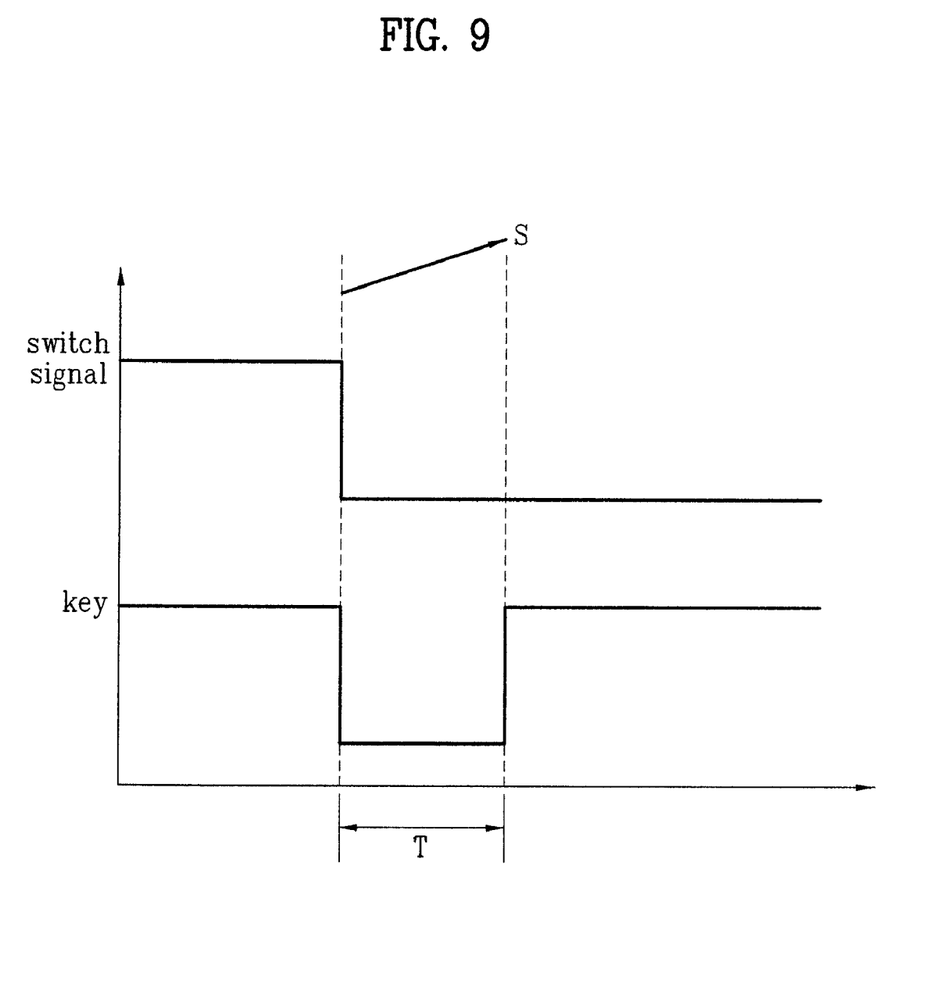
FIG. 9 is a timing diagram illustrating interrupt of a data input part of a communication terminal in accordance with the present invention.

FIG. 8 is a flow chart illustrating a data input control process of the communication terminal according to the present invention, and FIG. 9 is a timing diagram illustrating the interrupt of the data input part.

When the communication terminal is powered on at step S10, the control unit determines whether the upper housing 20 moves or not at step S11. In other words, the control unit determines whether the upper housing 20 swings or not, based on the signals from the above-described switch for detecting the swinging of the upper housing 20.

If determining that the upper housing 20 moves, the control unit temporarily interrupts the operation of the data input part, i.e., the keys at step S12. Accordingly, the operation of the corresponding keys is disabled.

FIG. 9 illustrates an example of setting the disabled-time for controlling the operation of the keys.

When the movement of the upper housing 20 is detected, the control unit interrupts the operation of the keys, and thereafter, operates a timer for counting the preset disabled-time. When the disabled-time expires, the control unit removes the interrupt of the corresponding keys at step S13.

In other words, during the disabled-time from when the movement of the upper housing 20 is detected, the operation of the keys is disabled, and when the disabled-time expires, the operation of the keys is normalized.

A point S in FIG. 9 means a point of time when the upper housing 20 starts moving. The control unit disables the operation of the keys during time T from the point S. The time T is set to be about 1 sec. However, the time T may be a little bit different according to the types or operating modes of the communication terminals.

As apparent from the above description, according to the present invention, the communication terminal is configured to make efficient use of the space for swinging the display unit such that the main body includes the slanted surface formed between the upper stepped surface and the lower stepped surface. Accordingly, a space where the keys for fulfilling the diverse and high-quality communication services are additionally mounted can be acquired.

Further, since the keys can be disposed at the upper stepped surface, the lower stepped surface and the slanted surface of the main body, the using efficiency of the various keys is maximized.

Also, since the operation of the data input part is controlled adequately by detecting the movement of the upper housing, a user is prevented from inputting the data by mistake while moving the upper housing.

For example, in case of the slide type terminal, although the user presses the keys by mistake while sliding up or down the upper housing, because the input data at this time is disregarded, the data input error can be prevented.

In the same manner, although the user presses the keys by mistake while swinging the upper housing of the swing type terminal, because the input data at this time is disregarded, the data input error can be prevented.

Also, since the communication terminal of the present invention is provided with the slanted key group, the clicking feeling when pressing the keys can be improved.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A communication terminal comprising:
   a first housing including an upper stepped surface, a lower stepped surface and a slanted surface formed between the upper stepped surface and the lower stepped surface, wherein the upper and lower stepped surfaces are parallel to each other;
   a first data input part provided on the slanted surface of the first housing;
   a second data input part provided on the upper stepped surface of the first housing;
   a second housing which is oppositely coupled to the first housing for surface to surface contact, the second housing provided to selectively cover up the first data input part by rotation; and
   a control unit which disables operation of the first data input part and second data input part according to rotation of the second housing with respect to the first housing during a predetermined time from when the movement of the second housing is detected, wherein data input processes of the first data input part and of the second data input part are not performed when the operation of the first data input part and second data input part are disabled during the predetermined time,
   wherein operation of the second data input part is enabled both prior to beginning and after finishing the predetermined time,
   wherein the first housing and the second housing are rotatably connected by the same plane.

2. The communication terminal according to claim 1, wherein the second housing swings while opposing a portion of the first housing.

3. The communication terminal according to claim 2, wherein the control unit interrupts the operation of the first data input part during a time to when the second housing swings to a predetermined angle from when the movement of the second housing is detected.

4. The communication terminal according to claim 1, wherein the first data input part includes at least one key.

5. The communication terminal according to claim 1, wherein the first housing comprises a main body housing and the second housing comprises an upper housing.

6. The communication terminal according to claim 1,
wherein the control unit determines whether the second housing swings or not and controls input operation of the first data input part, and
wherein if determining that the second housing swings, the control unit disables the input operation of the first data input part.

7. The communication terminal according to claim 1, wherein the control unit interrupts the operation of the second data input part according to movement of the second housing with respect to the first housing during the predetermined time from when the movement of the second housing is detected.

8. The communication terminal according to claim 1, wherein the second housing includes at least one output part which is positioned at an opposite surface of the second housing to a surface facing the lower stepped surface.

9. The communication terminal according to claim 8, wherein the output part includes a display device.

10. The communication terminal according to claim 1, wherein
a third data input part is provided at the lower stepped surface.

11. The communication terminal according to claim 10, wherein the third data input part is shielded or exposed according to the swinging of the second housing.

12. The communication terminal according to claim 10, wherein the control unit interrupts the operation of the third data input part according to movement of the second housing with respect to the first housing during the predetermined time from when the movement of the second housing is detected.

13. The communication terminal according to claim 10, wherein the first data input part and the third data input part are formed at one key pad.

* * * * *